United States Patent
Tolson

(10) Patent No.: US 11,463,290 B2
(45) Date of Patent: Oct. 4, 2022

(54) DEVICE AND METHOD FOR IMPROVED DEMODULATION OF MULTIPLE MODULATION SCHEMES

(71) Applicant: THE SECRETARY OF STATE FOR FOREIGN AND COMMONWEALTH AFFAIRS, London (GB)

(72) Inventor: Nigel James Tolson, London (GB)

(73) Assignee: The Secretary of State for Foreign and Commonwealth Affairs, Cheltenham (GB)

(*) Notice: Subject to any disclaimer, the term of this patent is extended or adjusted under 35 U.S.C. 154(b) by 0 days.

(21) Appl. No.: 17/291,243

(22) PCT Filed: Nov. 5, 2019

(86) PCT No.: PCT/GB2019/000153
§ 371 (c)(1),
(2) Date: May 4, 2021

(87) PCT Pub. No.: WO2020/095013
PCT Pub. Date: May 14, 2020

(65) Prior Publication Data
US 2021/0392019 A1    Dec. 16, 2021

(30) Foreign Application Priority Data

Nov. 6, 2018 (GB) ..................................... 1818076

(51) Int. Cl.
*H04L 5/12*        (2006.01)
*H04L 23/02*       (2006.01)
(Continued)

(52) U.S. Cl.
CPC .......... *H04L 27/183* (2013.01); *H04L 27/227* (2013.01); *H04L 27/3488* (2013.01);
(Continued)

(58) Field of Classification Search
CPC . H04L 27/183; H04L 27/227; H04L 27/3488; H04L 27/366; H04L 27/3818; H04L 27/3411; H04L 27/3444
(Continued)

(56) References Cited

U.S. PATENT DOCUMENTS 7,386,056 B2 * 6/2008 Walker ................ H04L 27/2626
                                                    375/260
9,971,378 B1 * 5/2018 Fahim .................... H03L 7/0812
(Continued)

FOREIGN PATENT DOCUMENTS

EP      1583271 A2    10/2005
EP      2244407 A2    10/2010
(Continued)

OTHER PUBLICATIONS

United Kingdom Patent Application No. GB1818076.0, Search Report dated Mar. 21, 2019, 4 pages.
(Continued)

*Primary Examiner* — Tanmay K Shah
(74) *Attorney, Agent, or Firm* — Kilpatrick Townsend & Stockton LLP

(57) ABSTRACT

A demodulation method and apparatus is disclosed that is for use on a modulated communication signal. The method includes receiving the modulated signal including a first set of complex symbols and at least one further set of complex symbols; applying a Forward Error Correction (FEC) decoding technique; applying a first phase estimation technique to the first set of symbols; applying a second phase estimation technique to the further set of symbols to determine phase information for the modulation signal using a first phase estimation means; and repeating in part using at least one further phase estimation means to identify the presence of phase rotation. Beneficially the method enables the use of large block sizes in the FEC technique.

18 Claims, 18 Drawing Sheets

(51) Int. Cl.
*H04L 27/18* (2006.01)
*H04L 27/227* (2006.01)
*H04L 27/34* (2006.01)
*H04L 27/36* (2006.01)
*H04L 27/38* (2006.01)

(52) U.S. Cl.
CPC ........ *H04L 27/366* (2013.01); *H04L 27/3818* (2013.01); *H04L 27/3411* (2013.01); *H04L 27/3444* (2013.01)

(58) Field of Classification Search
USPC .......................................... 375/262
See application file for complete search history.

(56) References Cited

U.S. PATENT DOCUMENTS

| | | | | |
|---|---|---|---|---|
| 2002/0106036 A1* | 8/2002 | Shiraishi | ............ | H04L 27/2273 375/329 |
| 2015/0188734 A1* | 7/2015 | Petrov | ................ | H03M 13/255 375/260 |
| 2019/0222461 A1* | 7/2019 | Atungsiri | ............... | H04J 11/003 |

FOREIGN PATENT DOCUMENTS

| | | |
|---|---|---|
| EP | 3297240 A1 | 3/2018 |
| WO | 0010301 A2 | 2/2000 |
| WO | 0251031 A1 | 6/2002 |
| WO | 2004034666 A1 | 4/2004 |
| WO | 2008121362 A1 | 10/2008 |

OTHER PUBLICATIONS

International Patent Application No. PCT/GB2019/000153, International Search Report and Written Opinion dated Feb. 5, 2020, 16 pages.
United Kingdom Patent Application No. GB1916059.7, Combined Search and Examination Report dated May 6, 2020, 6 pages.
United Kingdom Patent Application No. GB1916059.7, Examination Report dated Dec. 16, 2021, 5 pages.
United Kingdom Patent Application No. GB1916059.7, Examination Report dated Jun. 6, 2022, 4 pages.

* cited by examiner

DEVICE AND METHOD FOR IMPROVED DEMODULATION OF MULTIPLE MODULATION SCHEMES

The invention is in relation to signal demodulation in the communications field, particularly for use in high Doppler environments such as satellite communication and navigation systems. The signal demodulation method and device may also be used in Internet of Things (IOT) applications.

All commercial high-performance wireless communications systems such as Wi-Fi IEEE 802.11n/ac or 4G mobile use Phase Shift Keying (M-PSK) and Quadrature Amplitude Modulation (M-QAM) to achieve good spectral efficiency. Typically the number of unique symbol positions representing the modulation M, is controlled dynamically according to the received signal to noise ratio (SNR) and would be in the range 4 to 64 i.e. QPSK to 64-QAM respectively.

Unfortunately, all these modulation schemes contain lines of rotational symmetry in their in-phase and quadrature phase (IQ) constellations which give rise to de-rotation uncertainty for the phase in the demodulator. This phase uncertainty can be resolved by framing the data and including in the frame known synchronisation symbols (or pilot symbols) which when received can be used to position the constellation to the correct phase orientation for successful demodulation. The inclusion of known synchronisation symbols reduces the spectral efficiency of the data link and the data link must be punctuated with synchronisation data at such a rate so as to satisfy the coherence time of the channel.

Alternatively, an unmodulated parallel orthogonal spreading code or pilot code, can be summed to a modulated spreading code (payload) so that continuous de-rotation of the payload code can be provided by the pilot code. Such a method is employed in recent GNSS standards such as GPS and GALILEO.

Modern communication systems employ forward error correction (FEC) such as Turbo code or Low Density Parity Check (LDPC) coding to reduce errors in the transmitted data, especially when it is to be passed over unreliable or noisy channels. The performance of FEC is known to improve significantly as the block size is increased. However, if phase rotation occurs during the FEC block such that a number of symbols are incorrectly decided, the whole block of data may be lost and would need to be requested to be sent again by the receiver. Additionally, sudden phase indexing can occur in low SNR receivers where a digital phase locked loop is employed to de-rotate the signal. Such rotation is referred to as cycle slipping.

Further, when implementing Phase Shift Keying modulation the requirement to synchronise in frequency and phase usually requires the use of complicated and costly receivers and transmitters.

Therefore, embodiments of the present invention are intended to address at least some of the above described problems and desires. In particular there is a need to provide a demodulation technique that improves the performance of Forward Error Correction by increasing the block size, whilst monitoring and correcting for slowly changing phase rotation errors so as to provide a demodulation technique that utilises low cost equipment and offers reliable signal to noise ratios, and which is applicable to single and multicarrier arrangements.

Accordingly there is provided a method of de-modulating a modulated communication signal for use with a modulated signal comprising source data being mapped onto a first modulation scheme to obtain a first set of complex symbols and at least one further modulation scheme to obtain at least one further set of complex symbols, the method comprising:

a. receiving the modulated signal comprising the first set of complex symbols and at least one further set of complex symbols;
b. applying a Forward Error Correction (FEC) decoding technique;
c. applying a first phase angle estimation technique to the first set of symbols;
d. applying a second phase angle estimation technique to the second set of symbols; such that steps c and d to determine phase angle information for the modulation signal using a first phase angle estimation means; and
e. repeating steps c and d using at least one further phase angle estimation means to identify the presence of phase rotation.

The phase information is in fact instantaneous phase information.

The power of the source signal may be shared between the first modulation scheme and the at least one second modulation scheme.

The phase angle rotation information that is determined establishes whether there are any phase errors present so as to establish a reliable 'best fit' angle that prevents the need to dispose of the data block. This means that the block size can then be desirably increased avoiding unnecessary dropping of the data and subsequent further requests for the data.

Therefore, this method facilitates the use of large FEC block sizes without the concern of a phase rotation within the frame due to either channel damage of cycle slipping. The modulation orders of the first modulation scheme and the at least one further modulation scheme are different. The FEC decoding may be applied at an analysis circuit that is operably coupled to the receiver.

The FEC technique used may be block FEC. Whilst this method is applicable to other FEC methods, it is typical for FEC to use blocks (e.g. turbo or LPDC). In such cases the transmission performance is largely dependent on the block size i.e. the bigger the block size, the better the performance.

To equalise the BER performance the signal power may be allocated to the high order modulation technique because the angle between symbols is smaller. The modulation technique may be PSK.

The phase estimation means determined to be the 'best fit' i.e. best match is used to select the estimated symbol, and therefore provides an estimate of the source signal.

The first phase angle estimation means and the at least one further phase angle estimation means may be offset by a predetermined static phase error.

An error detection output signal may be provided where there is no match provided between any of the first and/or at least one further phase error estimation means.

The error detection output signal may be averaged over a predetermined time period or cycles. The phase estimation means with the lowest score across all phase estimation means' is selected i.e. after determining a running average score on each phase estimation means (which indicates how well the modulation is fitting the phase estimation means) the phase estimation means with the minimum score is selected as being the best match.

The method may further comprise determining a corresponding symbol estimate dependent upon the most likely phase estimation means candidate.

The method may further comprise applying a digital Phase Locked Loop (PLL) for removing any frequency errors.

The method may further comprise locking the PLL on the received signal that is associated with the at least one of the first modulation scheme or the at least one further modulation scheme.

The method may further comprise locking the PLL on the lower order modulation scheme. This technique provides a demodulator that operates better because there is a bigger angle between LUTs requiring for less averaging to be applied (in order to estimate the phase angle for a given symbol).

The method may further comprise identifying the lower order modulation scheme and selecting the PLL to be applied to the lower order modulation scheme so as to maximise the phase angle between symbols. This effectively provides automatic modulation identification. The alternative, of course, is for the receiver to have predetermined knowledge of the modulation type prior to receiving the signal. Alternatively, a FLL may be implemented and applied in the same way as a PLL.

The quantity of phase estimation means' implemented may be directly proportional to the order of the modulation scheme selected.

The first modulation scheme may be a 4PSK scheme and the at least one further modulation scheme may be a 3PSK scheme, the method may further comprise locking the PLL on the 3PSK scheme.

It is noted that in this embodiment it is the 3PSK scheme which is identified to be the lower order scheme and only three phase estimation schemes may be implemented to estimate the symbol spaced at 0, 120 and 240 degrees.

Beneficially, the method of the PLL comprises a Decision Direct Loop DDL.

For the avoidance of doubt the invention requires the implementation of at least two phase estimation means to determine the phase rotation presence.

The phase estimation means may comprise a LUT. The receiver may therefore comprise a LUT having one column for use to estimate the symbol received via the first branch and the second column may be used to estimate the symbol from the second branch. Subtracting the angles to produce a phase difference is an alternative embodiment and requires less columns of the LUT, but this embodiment has been found to provide inferior BER performance.

Alternatively, to the LUT approach, a conventional Maximum Likelihood estimator may be applied as the phase estimation means.

Preferably the method may also comprise the step of determining the source data in dependence upon the phase of the first set of complex symbols and the phase angle of the further set of complex symbols.

Any of the above-mentioned method steps may be implemented in a single carrier arrangement or a multi carrier arrangement.

In an alternative embodiment of the invention, there is provided a de-modulator device for use on a modulated communication signal which comprises source data being mapped onto a first modulation scheme to obtain a first set of complex symbols and at least one further modulation scheme to obtain at least one further set of complex symbols, the device comprising a receiver, processor and a memory, wherein the memory stores instructions that, when executed cause the processor to:

a. receive the modulated signal at the receiver, the modulated signal comprising the first set of symbols and at least one further set of complex symbols;

b. apply a Forward Error Correction (FEC) technique to the received signal;

c. apply a first phase angle estimation technique to the first set of symbols;

d. apply a second phase angle estimation technique to the second set of symbols; such that steps c and d determine phase information for the modulation signal using a first phase estimation means which is operably coupled with the processor; and e. repeat steps c and d using at least one further phase estimation means which is operably coupled to the processor so as to identify the presence of phase rotation.

The phase information is in fact instantaneous phase information.

The memory may store instructions that, when executed further cause the processor to determine the source data in dependence upon the phase angle of the first set of complex symbols and the phase angle of the further set of complex symbols.

The de-modulator device may further comprise determining the angular difference between the first set of complex symbols and the further set of complex symbols and subsequently determining the source data in dependence upon the angular difference.

A communications arrangement may comprise the hereinbefore described de-modulator device.

A multicarrier communications arrangement may be provided with multiple quantities of the hereinbefore de-modulator devices.

Whilst the invention has been described above it extends to any inventive combination of the features set out above, or in the following description, drawings or claims. For example, any features described in relation to any one aspect of the invention is understood to be disclosed also in relation to any other aspect of the invention.

The invention will now be described, by way of example only, with reference to the accompanying drawings, in which.

Figure 16:
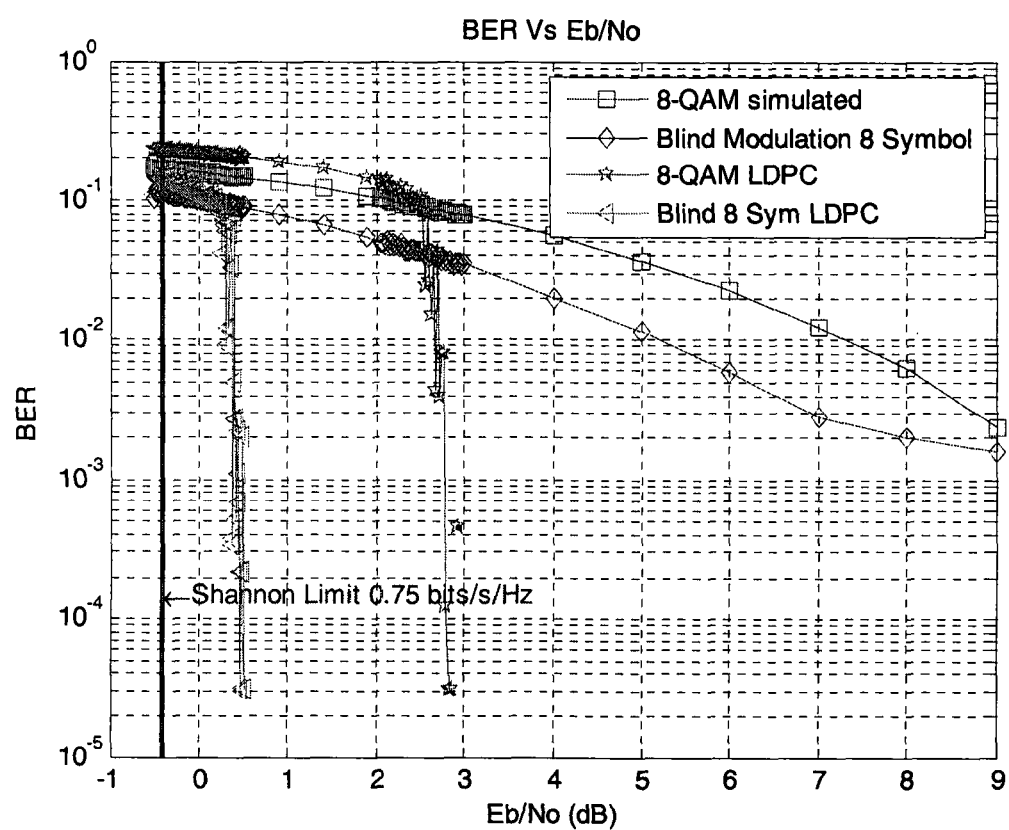
Figure 17:
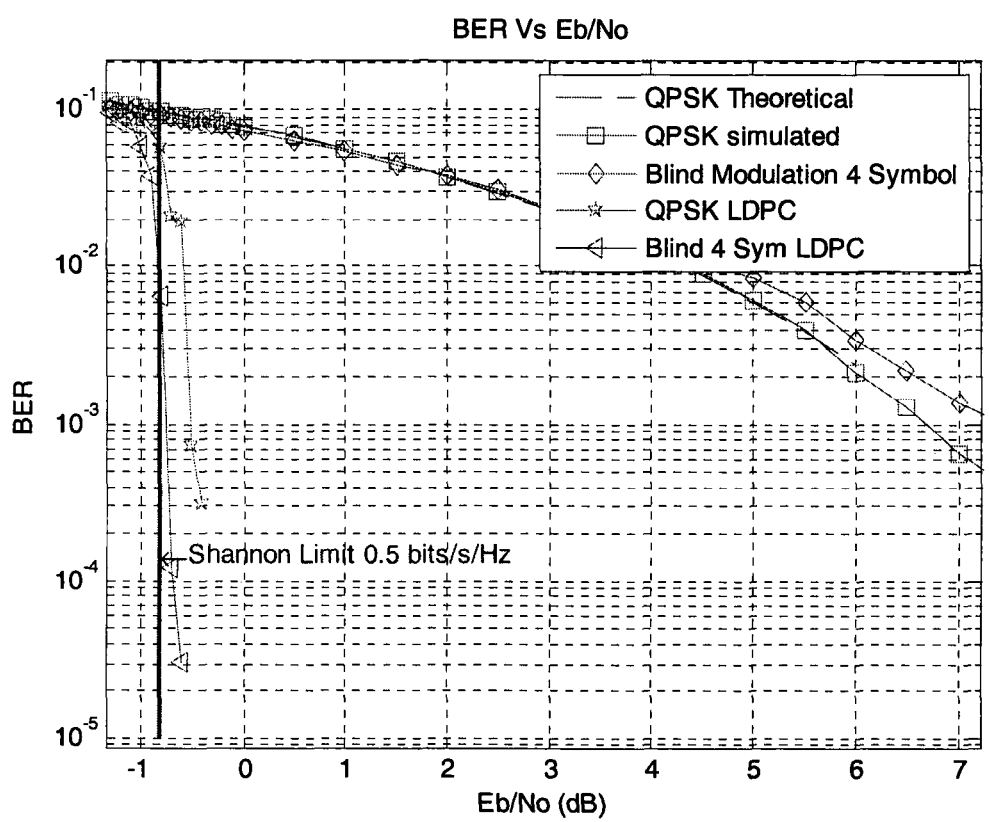
Figure 18:
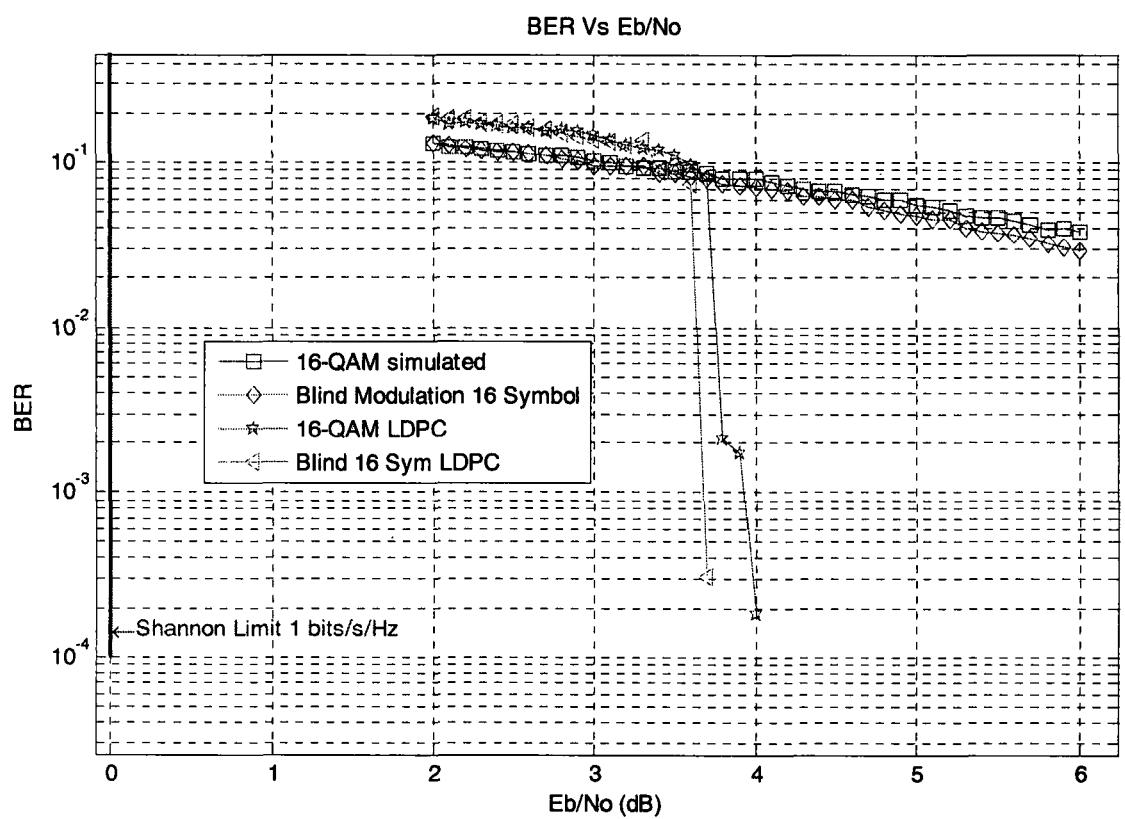

FIG. 16 shows a graph of theoretical BER curves for the 120 degree phase indexing error with 3-LUT demodulator (for the 8-QAM and 8 symbol blind modulation techniques);

FIG. 17 shows a graph of theoretical BER curves for the QPSK and 4 Symbol Blind modulation techniques;

FIG. 18 shows 17 symbol performance with and without LDPC coding; and

Figure 19:
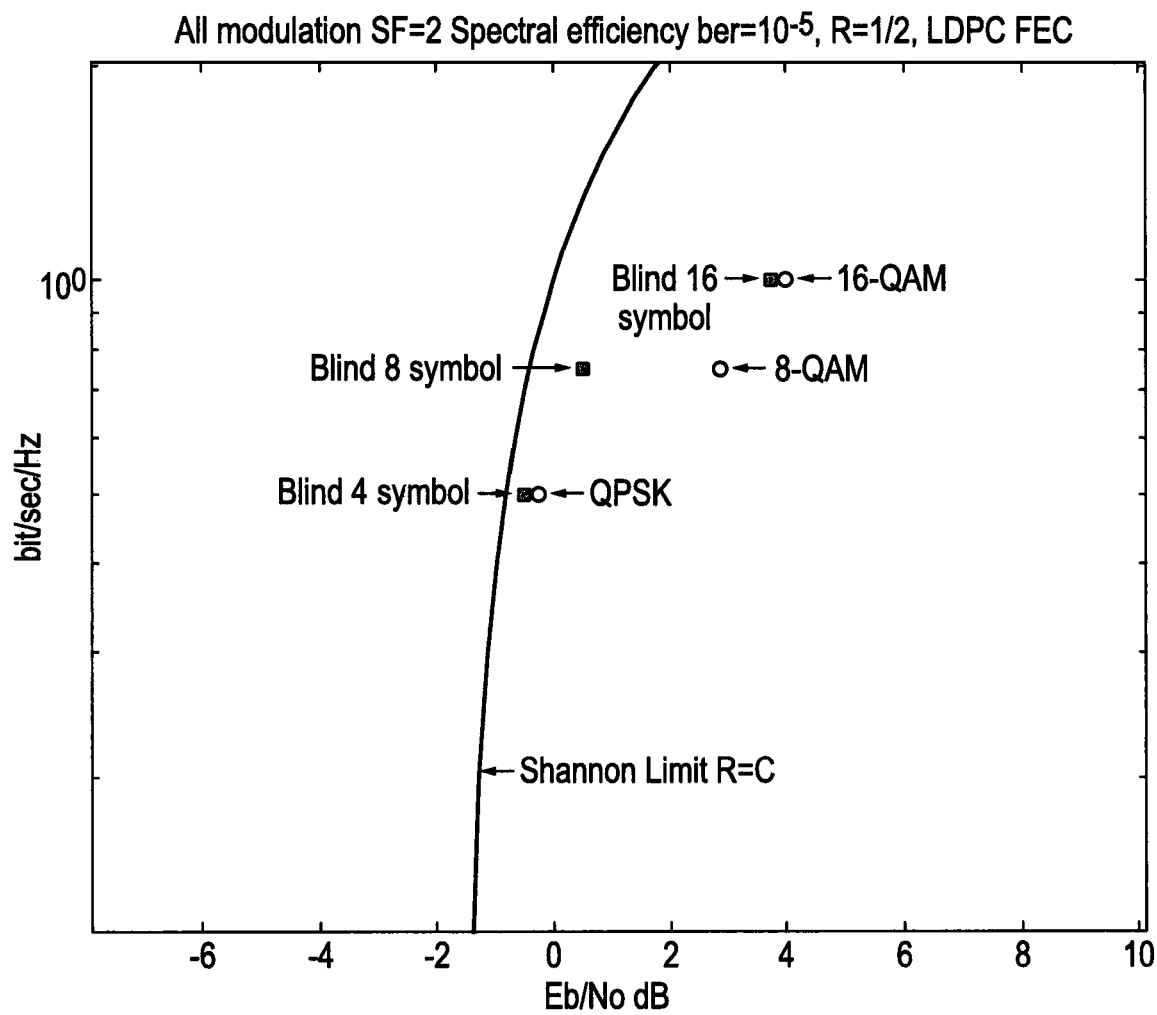
Figure 20:
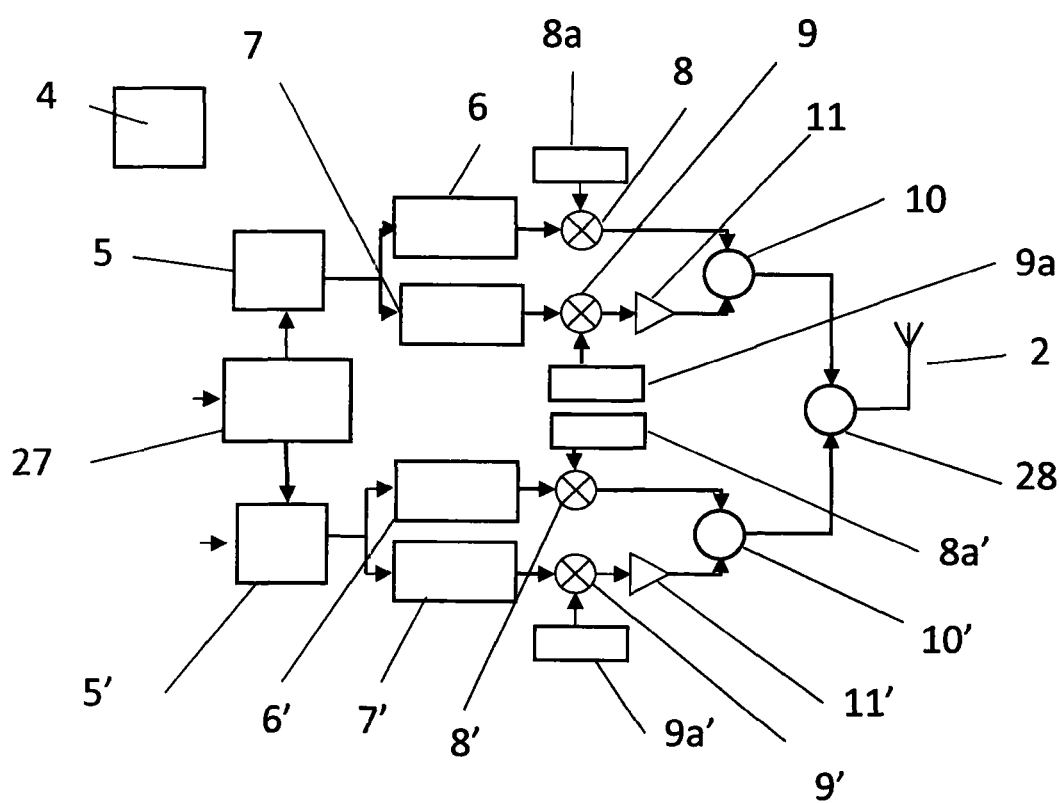

FIG. 19 shows spectral efficiency performance of rectangular QAM; and blind modulation; and FIG. 20 is a schematic of a multicarrier solution for the transmitter end.

In the Figures like elements are denoted by like reference numerals. The skilled reader will appreciate how complex the implementation of the method is, and thus the number of the optional features present, will be driven by the user requirements.

Figure 1:
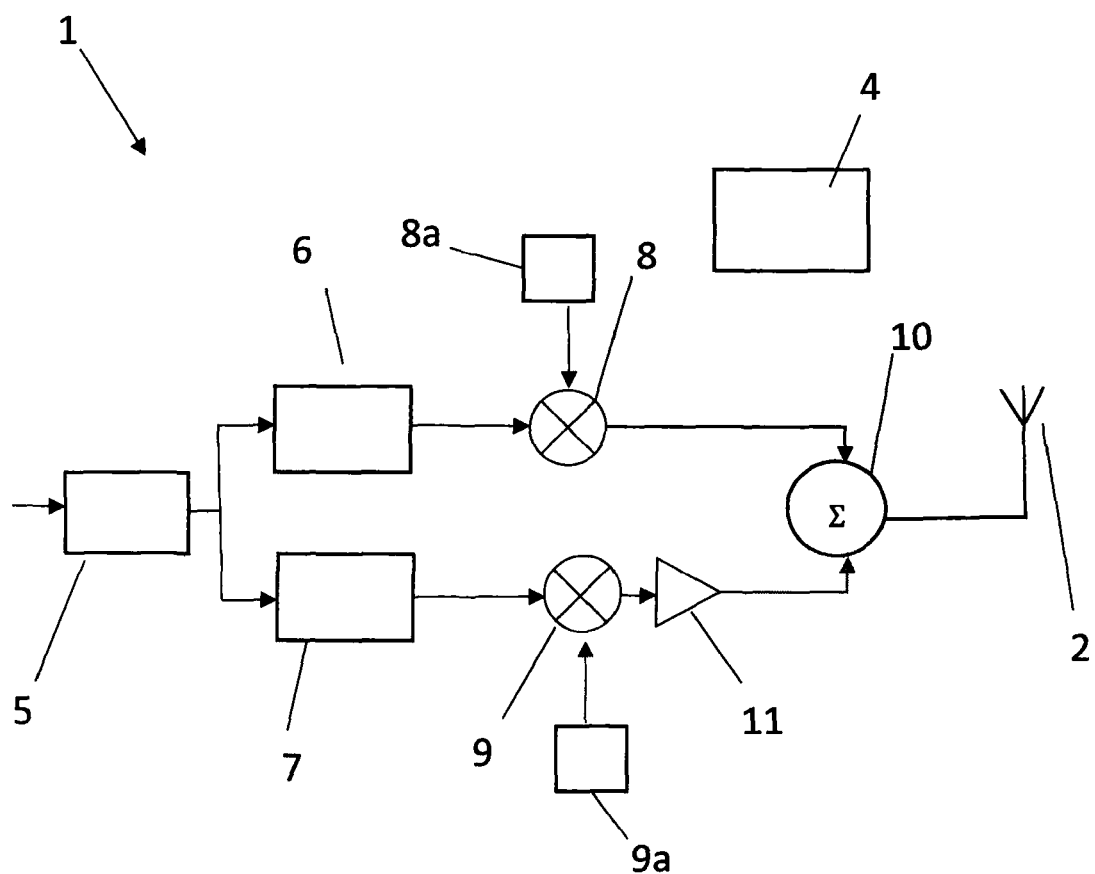
FIG. 1 is a schematic of the transmitter end of a communications device according to the invention.
Figure 2:
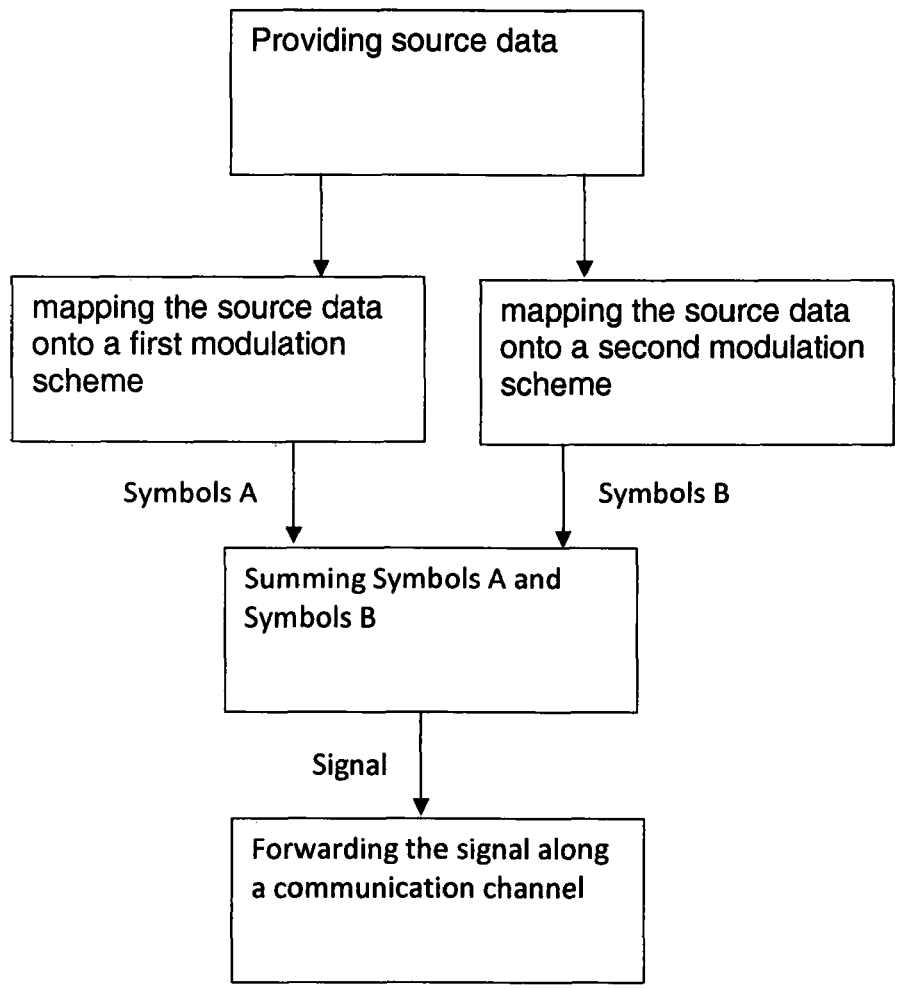
FIG. 2 shows a flow diagram of the method according to the invention at the transmitter end of the communications device.

Referring to FIG. 1, there is shown a transmitter block 1 (i.e. the transmitter end of a communications device) comprising a transmitter 2, processor and a memory 4. The memory 4 stores instructions that, when executed causes the processor to carry out a number of method steps as shown in FIG. 2, including:
a. providing a source signal where the discrete bits are provided by source information, these bits are grouped into symbols. For example, 3 bits form one symbol giving 8 symbol options 0:7;
b. mapping the discrete source signal onto a first modulation scheme to obtain a first set of complex symbols A;
c. mapping the discrete source signal onto a second modulation scheme to obtain a second set of complex symbols B;
d. combining e.g. summing the first set of complex symbols A and the second set of complex symbols B to form a modulated signal; and
e. forwarding the modulated signal along a communications channel.

Once the information is provided in the form of bits, the bits are converted to symbols by a converter 5. The predetermined signal power of the discrete source data is then split between the first modulation scheme via a first modulation scheme module 6 and the second modulation scheme via a second modulation scheme module 7. The modulation order of the first modulation scheme differs to the modulation order of the second modulation scheme to enable resolution of phase ambiguity due to non-identical effects on the different order modulation schemes passing along the same communications channel.

It is known for a symbol to be represented by a constellation point in a corresponding constellation diagram. The first modulation scheme and second modulation scheme are selected such that the angle between a selected symbol in the first constellation diagram and any symbol in the other constellation diagram is unique.

The modulation order of the first scheme is of an odd number and the at least one further modulation scheme is of an even number. It is preferable to select the scheme so as to create an overall 'even power of two' order modulation signal that is easily processed digitally whereby the summed M-PSK has M=2, 4, 8, 16 . . . i.e. $M=2^n$ where n=1, 2, 3 . . . .

In the first embodiment of the invention the system is simplified such that the first modulation scheme and the second modulation scheme is a Phase Shift Keying modulation scheme where the constellation points are provided in a single orbit.

In use the system has three bits [b0, b1, b2] per symbol, with 8 symbols being provided. At the transmitter end 1 there is obtained discrete source data having a signal power of a known value or given value which is unknown i.e. the signal power can be said to be predetermined. The 8 symbols are mapped onto two separate modulated complex values i.e. the 3-PSK and QPSK schemes which are spread by using orthogonal direct sequence spreading codes for example Walsh codes generated by respective code generators 8, 9. Therefore the two pathways are produced by multiplication by the known orthogonal spreading codes which are correctly time aligned (provided by spreading function module 8 and spreading function module 9 each located on differing processing paths and the codes are provided by respective spreading code sources 8a, 9a). For this set up the minimum value of the spreading factor is 2 and the codes are {1,1} for the Q-PSK and {1,-1} for the 3-PSK. Once spread the signals are summed together using a summing module 10 whereby slightly more of the predetermined signal power is allocated to the QPSK signal. This is achieved by applying a gain by means of a gain amplifier 11 located in the second processing pathway at a position intermediate the spreading function module 9 in the 5-PSK processing arm and the summing module 10. This redistribution of the signal power effectively equalises the error of the 3-PSK and QPSK, by taking power from 3-PSK and giving it to the QPSK. This normalising effect is required since the 3-PSK has a lower BER performance than QPSK due to the angle between symbol positions (which can be represented in the IQ constellation). This is because for the QPSK the angles between the symbols are smaller than for the 3-PSK and therefore can't tolerate as much signal to noise due to the location of the boundary geometries.

Notably, the constellation of the odd PSK scheme is asymmetric i.e. the lines of symmetry in the IQ constellations are removed (and this therefore also applies when the symbols for both the odd and even PSK schemes are mapped).

Once summed together the final modulated signal comprising the summed 3-PSK and QPSK symbols is forwarded to a transmitter 2 and transmitted along a communications channel (not shown).

FIG. 1 shows the base band model, however for the device to work at a carrier frequency, a frequency up conversion circuit (not shown) is required to be located in the path prior to the antenna 2.

Figure 3A:
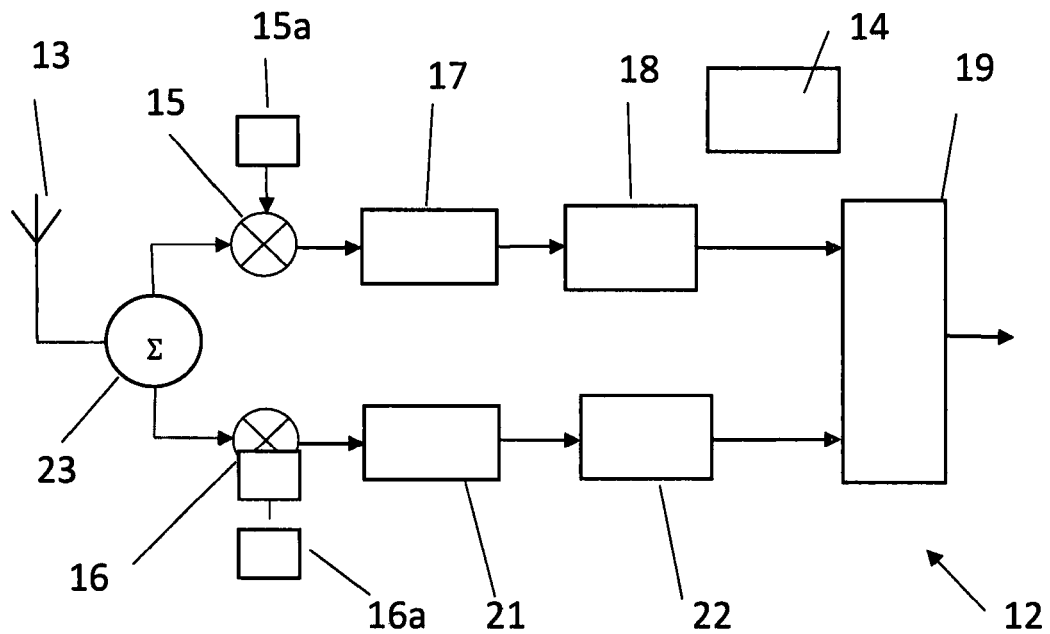
FIG. 3a shows a schematic of the receiver end of a communications device where the phase angles are provided.

In FIG. 3a, there is shown a receiver block 12 (i.e. a receiver end of a communication device) which comprises a receiver 13 and a further memory 14 and processor. This further memory 14 stores instructions that when executed cause the processor to perform the method steps of FIG. 4:
receive the modulated signal which includes the first set of complex symbols and the second set of complex symbols;
measure the phase angle of the first set of complex symbols A;

measure the phase angle of the further set of complex symbols B;
and
determine discrete source data in dependence upon the phase angles.

The complex symbols are therefore estimates based on the first phase angle and the second phase angle i.e. the two angles are fed directly into the look up table 19 and there is no requirement for a summing module 24 in FIG. 3a.

The received signal is split into two pathways via a summing module 23 and then de-spread at the respective de-spreading function modules 15, 16 using the 0 and 1 spreading codes provided by the code source 15a, 16a. This provide the two routes of the signal. Taking the first route, the de-spread signal is then integrated over the symbol period (i.e. from 0 second to the symbol period) at the integrator 17. Then the Arctan 2 of the complex value is taken at the Arctan 2 circuit 18 to obtain the phase of the signal.

The same process is performed along the second route (or pathway) using the integrator 21 and the Arctan 2 circuit 22. Therefore, the phase angles of the first set of symbols and the second set of symbols are resolved separately in the receiver block 12.

The LUT (Look Up table) 19 having two columns of phase angle to symbol estimated values is then implemented and the symbols are estimated at the output of the receiver block 12.

Figure 3B:
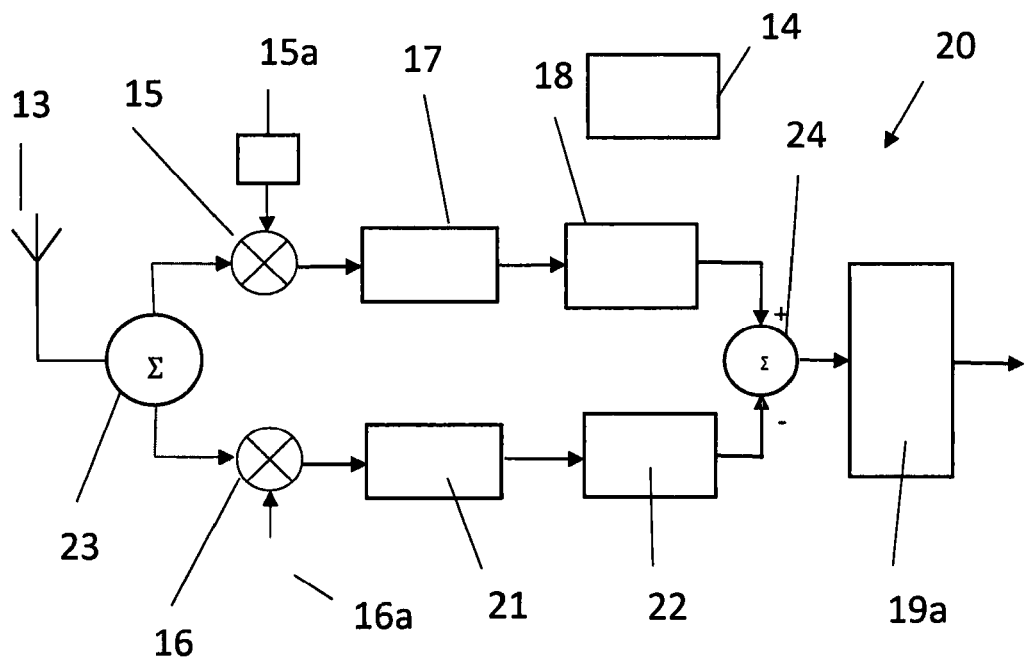
FIG. 3b shows a schematic of the receiver end of a communications device according to the invention where the difference of the angles are provided.

The set up as shown in FIG. 3b operates in a similar way to that of FIG. 3a, however the difference between the phase angles for the first set of symbols and the second set of symbols are determined at the summing module 24.

Both FIG. 3a and FIG. 3b are basic receiver blocks 12, 20 (base band model i.e. no frequency translation). Therefore, to operate at a carrier frequency, a frequency down conversion block (not shown) is required to be located in the pathway after the receiving antenna 13.

Figure 4:
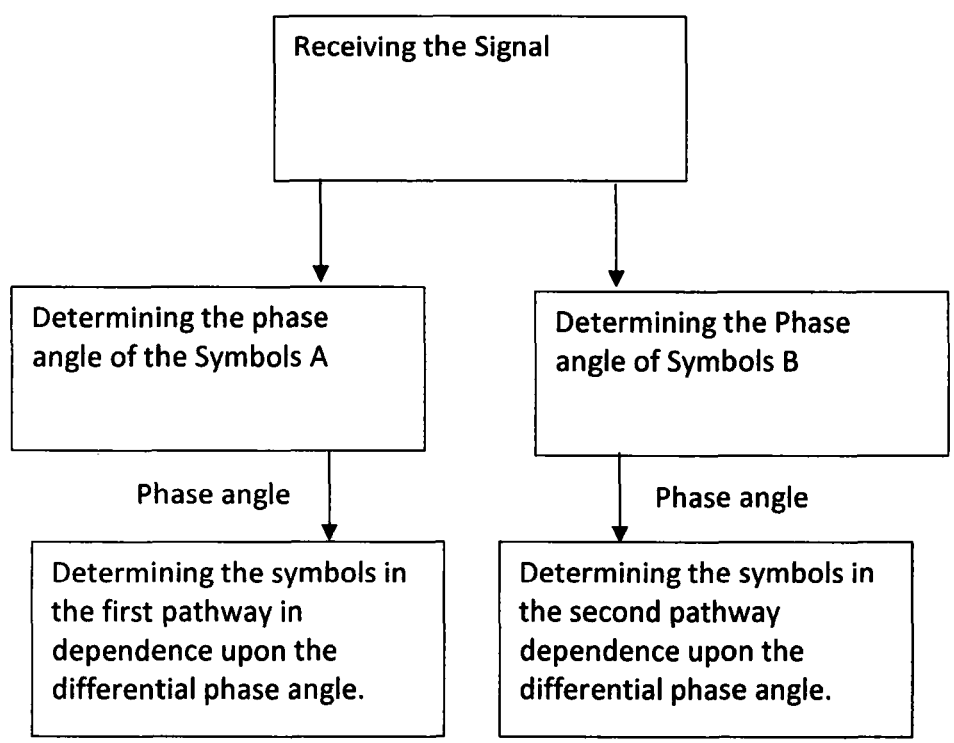
FIG. 4 shows a flow diagram of the method according to the invention at the receiver end of the communications device.

As shown in FIG. 4, the receiver end correlates on the two spreading codes (de-spreads the codes) and then measures the phase of each symbol separately for both the 3-PSK and the QPSK when correlated at the receiver. After de-spreading, the phase angle is obtained by integrating across the symbol period and then taking the Arctan 2 (A TAN 2) of the complex number.

The demodulator determines the symbol by jointly measuring the phase and the magnitude of the signal. By obtaining the symbol information in this way, there is no requirement for implementing a feedback loop to track the phase, making for a far more simplified system.

Figure 5:
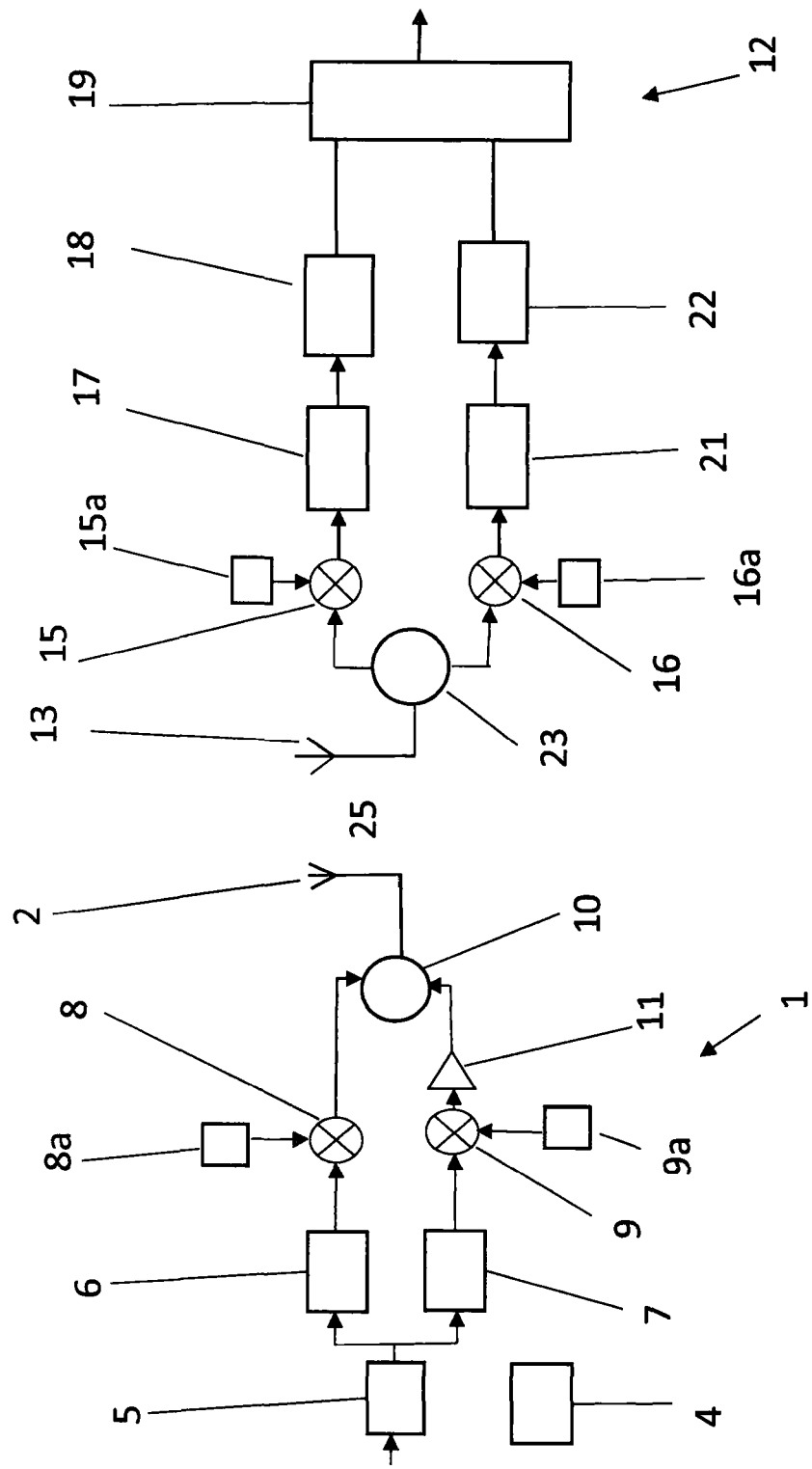
FIG. 5 shows a schematic of a single carrier communications device according to the invention.

FIG. 5 shows a device for single carrier modulation whereby the transmitter end 1 of the communications device and the receiver end 12 of the communications device are separated by a communication channel 25 of arbitrary distance or phase. The communication channel is a wireless channel. The objective of the communication device is to determine the discrete source data regardless of the arbitrary distance or phase experienced by the modulated signal. This is achieved by relying on the fact that the first set of symbols A and the second set of symbols B (which can be represented as an 10 constellation) experience the same distance or phase shift as they travel along the communication channel. By comparing the two phase angles, the distance or phase shift can be accommodated for and the original symbol information can be recovered. Therefore, by using the technique of the invention there is no requirement to use a pilot signal to aid synchronisation.

The symbol mapping for a three bits per symbol scheme is shown in Table 1 for the 3-PSK and QPSK angles in degrees.

TABLE 1

| Symbol | 3-PSK angle (degrees) | QPSK angle (degrees) | QPSK-3-PSK differential angle (degrees) |
|---|---|---|---|
| 0 | 0 | 0 | 0 |
| 1 | 120 | 0 | 120 |
| 2 | 240 | 0 | 240 |
| 3 | 240 | 90 | 150 |
| 4 | 0 | 270 | −270 |
| 5 | 0 | 180 | −180 |
| 6 | 120 | 180 | −60 |
| 7 | 0 | 90 | −90 |

Table 1 shows that the phase difference between the odd 3-PSK and the QPSK provides the required unique angle to provide the blind properties of the modulation scheme i.e. removes the need for a pilot signal (or header).

This technique relies on the fact that the first complex symbol is mapped to a first angle and the second complex symbol is mapped to a second angle (differing to the first angle). The mapping is designed to give the maximum phase difference between symbols and only one bit difference between the angular difference for the 3-PSK and QPSK i.e. it is Gray coded. The maximum phase difference between symbols can be simply evaluated by calculating the standard deviation of the different angles. This then provides optimisation of the performance of the system. Table 1 is not a unique solution and other optimum solutions may exist.

In use, at the transmitter the power of the signal is shared between the two codes, with a small gain bias being applied to the higher order M-PSK scheme, which in this example is the QPSK.

The odd PSK is spread using a direct sequence Binary Phase Shift Keying (BPSK) spreading codes and WALSH codes are used with a spreading factor (SF) of 2. The codes used are, {1 1} for the 4-PSK and {1 −1} for the 3-PSK. Once spread the signals are summed with slightly more power allocated to the QPSK signal and less to the 3-PSK signal. A bias value of 1.2 is used for the 8 symbol modulation technique. The peak to average power obtained through simulation was 1.875 dB.

The receiver correlates on the two spreading codes and then measures the phase of each symbol separately for both the QPSK and the 3-PSK. Then after a pre-processing step, resultant angles are compared in a two input Look-Up-Table (LUT) to achieve estimation of the original 8-PSK symbol. At function A, there is performed a hard angle estimate. Negative angle values are also corrected for at this point.

If u(t) represents the angle at the output of the a tan 2 function in degrees, then a first decision is made $$r(t) = \text{round}\left(\frac{u(t)}{\left(\frac{360}{M}\right)}\right), \quad \text{Eq 1}$$

Where M is the number of unique symbols in the modulation for example 3-PSK has M=3 and QPSK has M=4.

Following the hard angle decision the negative angle is corrected where the input to the LUT is $$z(t) = \left(\frac{360}{M}\right)(r(t) + ((r(t) < 0)M)). \quad \text{Eq 2}$$

Figure 6:
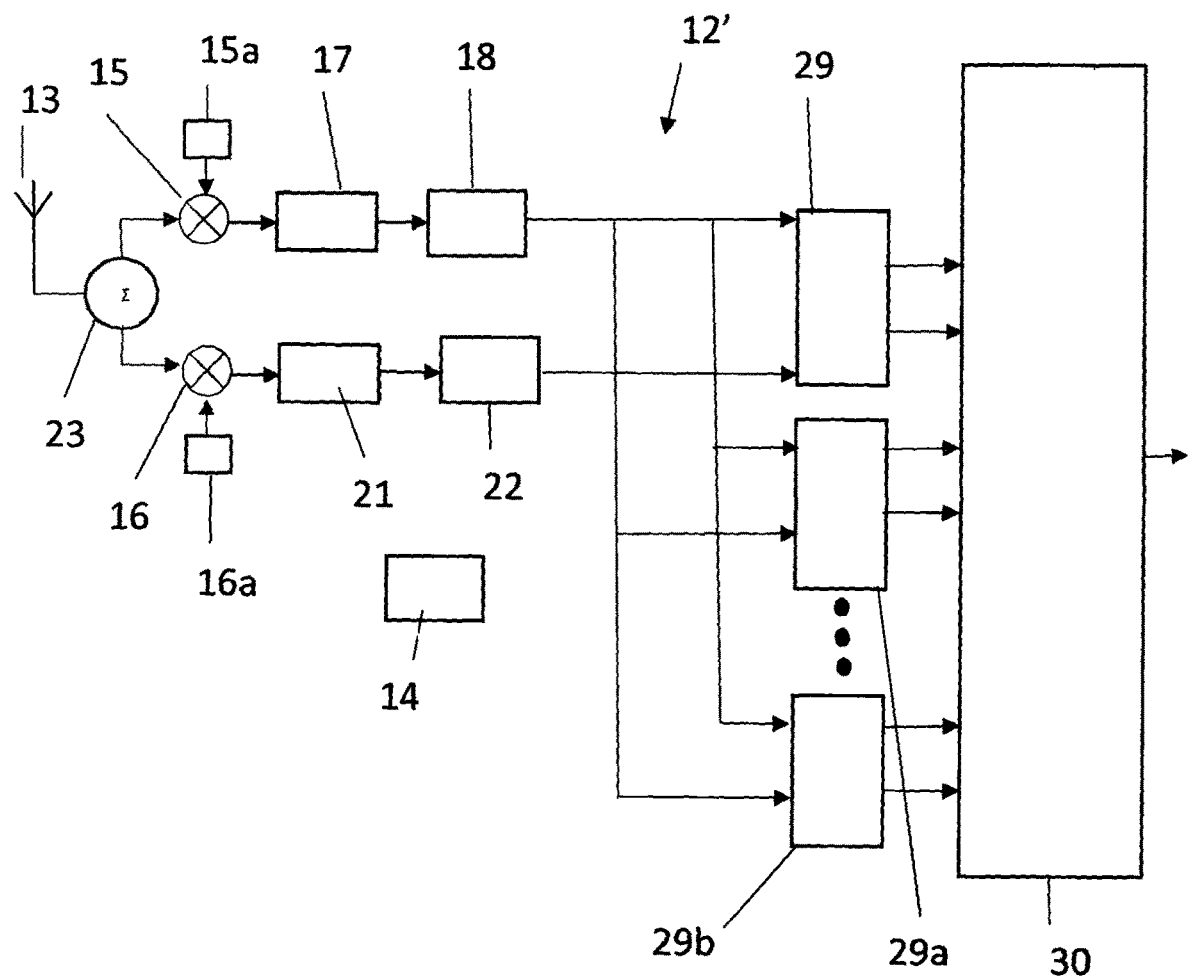
FIG. 6 shows a schematic of a multiple LUT demodulation solution for the receiver end.

In the case that the receiver is required to operate under a completely unknown channel phase, a bank of LUT's are configured, whereby each LUT is off-set by a static phase error. As an example, 24 LUT's are implemented which are all offset by 15 degrees. Each LUT has a first output and a second output. The second output is an additional output that is asserted when an individual LUT does not achieve a match. It therefore acts as an error output. It is effectively a 'no fit' value. This no fit value is averaged over a predetermined time period and then compared to the 24 LUT's. The LUT with the least difference when compared to the average 'no fit' value is selected as the most likely LUT candidate of providing the channel phase match and is then used to estimate the corresponding symbol. FIG. 6 shows the configuration for a multiple LUT demodulator using n LUTs. Additional circuitry to average the No-fit values and a multiplexer to select the most likely symbol is not shown. The receiver is operably coupled to a control circuit and memory that stores code to be used to execute the above-mentioned method of the invention.

Since the unique angular difference between symbols has been designed to be as large as possible, noise vectors will act differently on each symbol. The total symbol error rate is:

$$ptot(e(s)) = erfc\left[\sqrt{\frac{E_s}{N_0}} \sin\frac{\pi}{M}\right], \quad \text{Eq 3}$$

where M is the number of unique symbols in the modulation.

Due to the orthogonality of the Walsh spreading codes used, Equation 3 holds for both the 3-PSK and the 4-PSK when correlated at the receiver. Since the unique angular difference between symbols has been designed to be as large as possible, noise vectors act differently on each value. Therefore, a symbol error on the 3-PSK will not necessarily result in an error rate in the 4-PSK.

The total symbol error rate for standard M-PSK is:

$$ptot(e(s)) = \quad \text{Eq 4}$$

$$erfc\left[\sqrt{0.5\frac{E_s}{N_0}\left(1 - \frac{bias}{2}\right)} \sin\frac{\pi}{3}\right] + erfc\left[\sqrt{0.5\frac{E_s}{N_0}\left(1 - \frac{bias}{2}\right)} \sin\frac{\pi}{4}\right].$$

It can therefore be observed from equation 4 that the symbol power is divided by two for each code and then adjusted with a power bias with more power allocated to the QPSK (i.e. 4-PSK), since the angle between symbols is smaller than for the 3-PSK.

To convert from energy per symbol to energy per bit the following formula is used:

$$\frac{E_b}{N_0} = \frac{E_S}{N_0} = -10\log_{10}k, \quad \text{Eq 5}$$

where $k = \log_2 M$.

Figure 7:
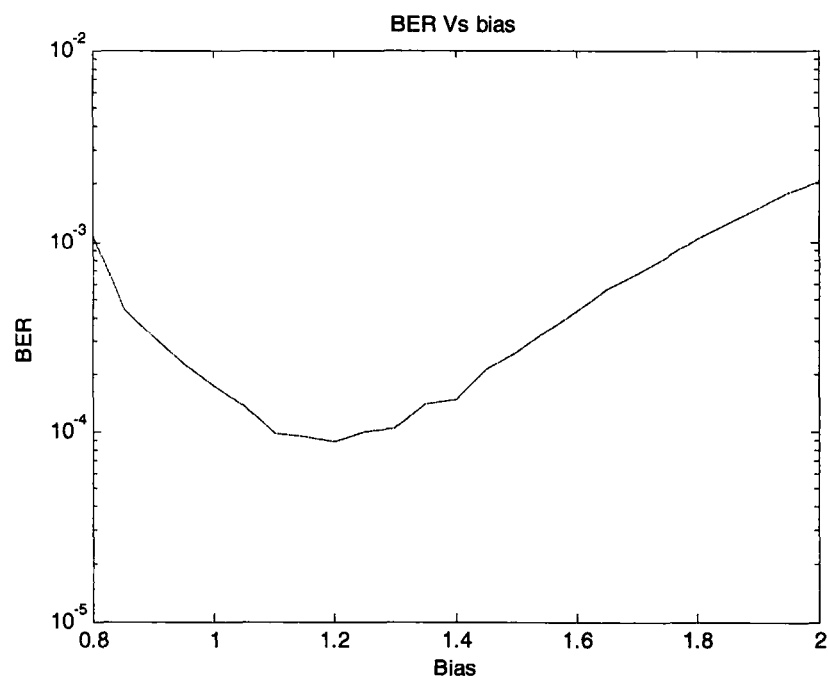
FIG. 7 shows a modelled bias curve to obtain the optimum gain for the method according to the invention.

To convert from symbol error rate to bit error rate the modulation is assumed to be approximately GRAY coded, so that one symbol error does not result in k bit errors, so that:

$$ptot(e(b)) = ptot(e(s)) \cdot 1/k \quad \text{Eq 6}$$

when $E_s/No$ ratio is fixed and the bias value swept then an optimum linear value of 1.2 is determined through simulation as shown in FIG. 7 (which indicates that the gain block must be set to a linear value of 1.2 to provide optimum BER performance). The BER performance is given for a fixed Eb/No (9 dB) value when the bias is swept from 0.8 to 2.

Figure 8:
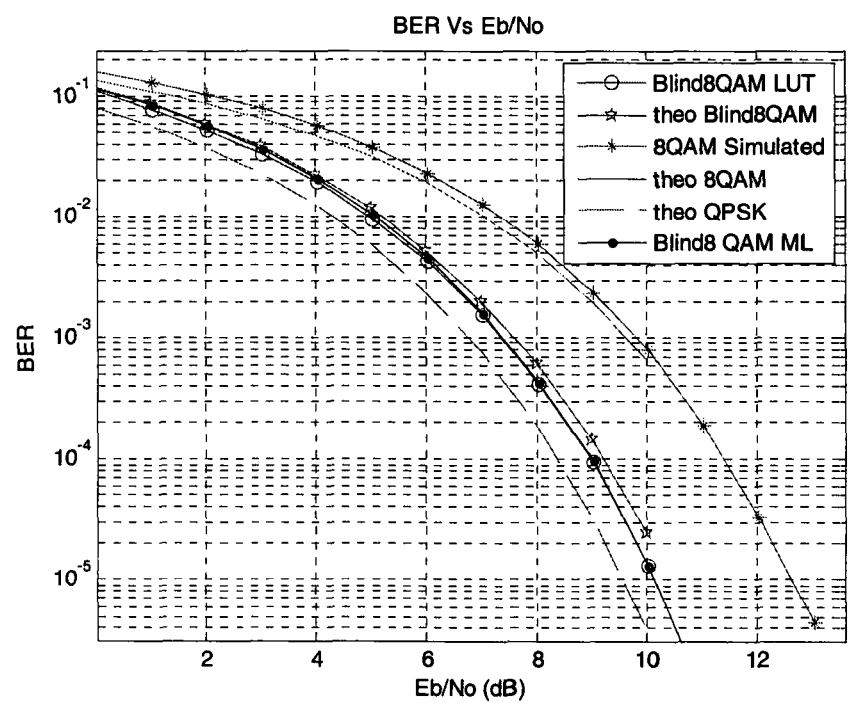
FIG. 8 shows a graph of the theoretical BER curves for the 8-PSK blind system according to a second embodiment of the invention.

It is shown in FIG. 8 that the new blind 8-QAM method outperforms the spread 8-QAM by approximately 2.3 dB at $10^{-6}$ BER.

To obtain this result the value was 1.2 for the 4-PSK and 1.0 for the 3-PSK. FIG. 8 shows the performance for additive white Gaussian noise with spreading factor of 2 for both the conventional 8-QPSK spread and the new Blind 8 QAM for both LUT and ML demodulator configurations. $1e^6$ symbols were evaluated at each Signal to Noise Ratio value and the gain block was set to a linear value of 1.2 (as shown to be the optimised point from FIG. 7).

Figure 9:
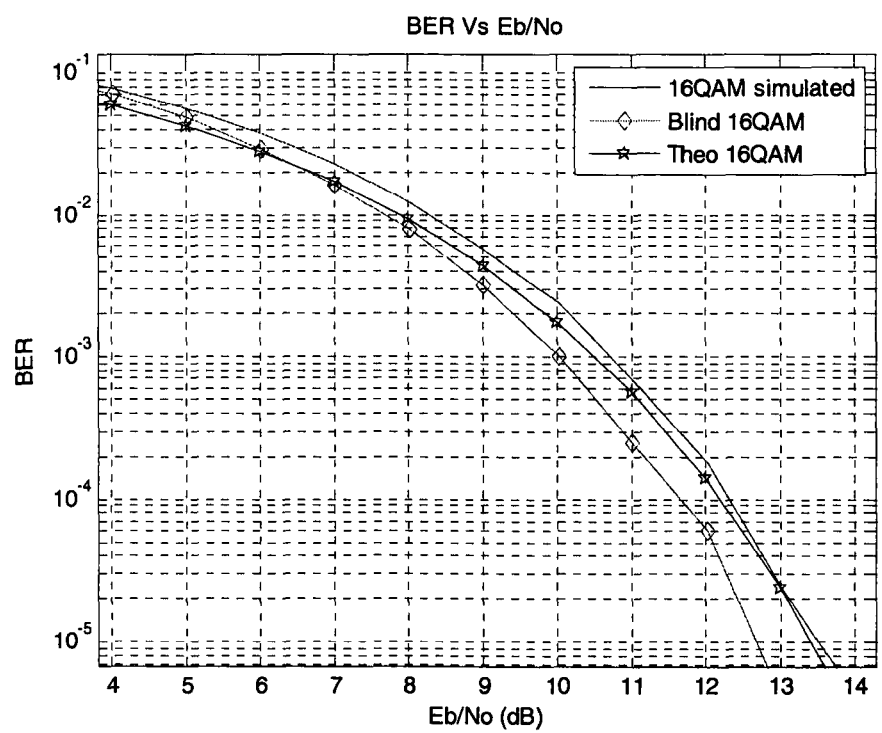
FIG. 9 shows a graph of theoretical BER curves for the 16-QAM blind system according to the second embodiment of the invention.

In a similar way to the 8 symbol version, a 16 symbol version can be constructed using the same angle mappings as given in Table 1, using the first 3 bits of a 4 bit group as the 8 symbol mapping. The fourth bit is then used to control the magnitude of both the 3-PSK and 4-PSK, so giving a 6 symbol mapping and an 8 symbol mapping. In this arrangement the peak to average power ratio was measured from simulation as 2.996 dB. In FIG. 9 it is shown that the performance of Blind16QAM is approximately 0.73 dB better than the 16 QAM theoretical calculation at the $10^{-6}$ BER value.

In an alternative embodiment of the invention, a four symbol version can be produced with the symbol to angle mappings as shown in Table 2. The bias value for the 4 symbol technique was set to 1.4.

TABLE 2

| Symbol | 3-PSK angle (degrees) | BPSK angle (degrees) | BPSK-3-PSK differential angle (degrees) |
|---|---|---|---|
| 0 | 0 | 0 | 0 |
| 1 | 120 | 0 | 120 |
| 2 | 0 | 180 | −180 |
| 3 | 240 | 180 | 60 |

Figure 10:
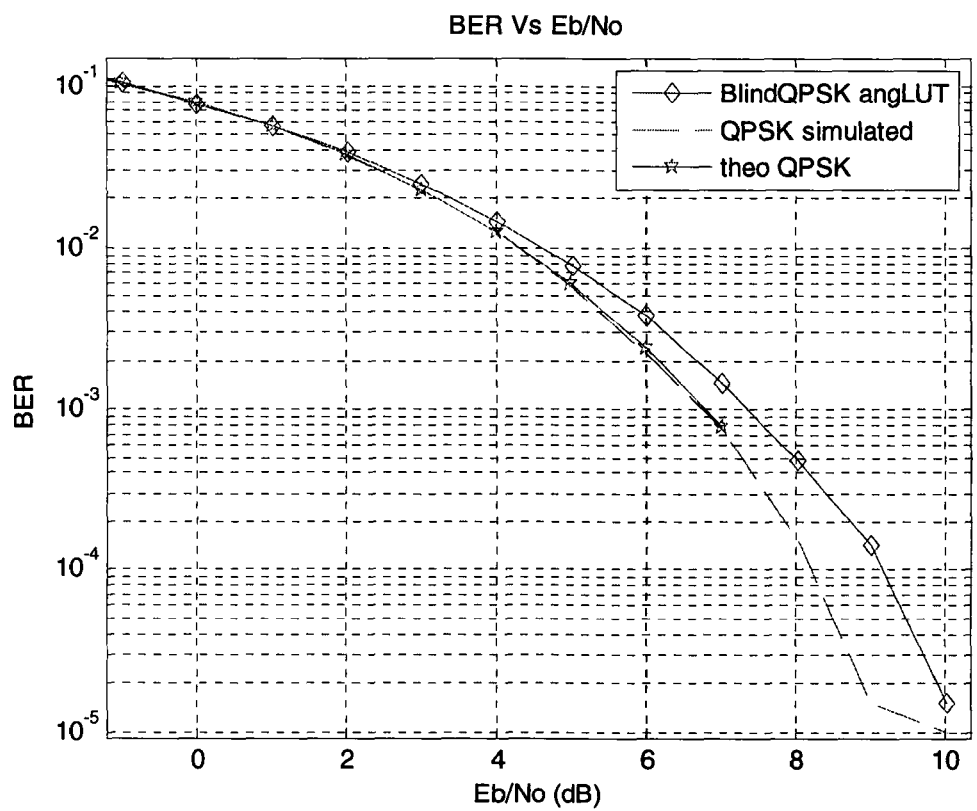
FIG. 10 shows a graph of theoretical BER curves for the Q-PSK blind system according to the third embodiment of the invention.

FIG. 10 shows the simulated peak to average power ratio to be 1.976 dB.

Figure 11:
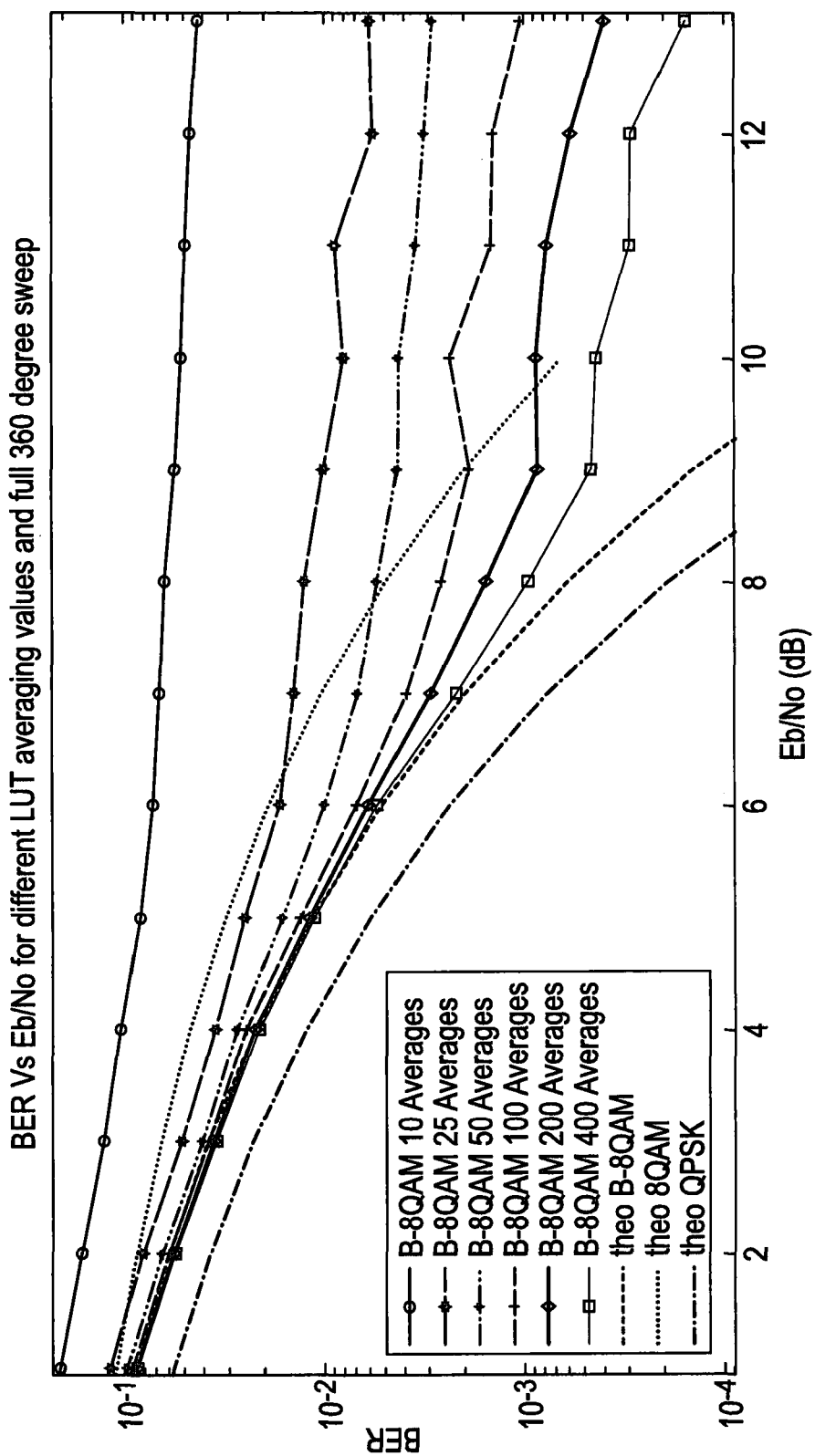
FIG. 11 shows BER curves with a continuous 1 degree phase increment every 280 symbols for various symbol averaging on LUT selection.

If there is no PLL circuitry and all the de-rotation is performed with a feed forward structure, then by using the previously described 24 LUT arrangement, receiver tracking of the instantaneous phase information can be achieved. The number of averages of each LUT's no fit value was varied and the BER vs Eb/No results were obtained and are shown in FIG. 11. The BER curves were created with the continuous 1° phase increment every 280 symbols and various symbol averaging on LUT selection. In this embodiment 24

Figure 12:
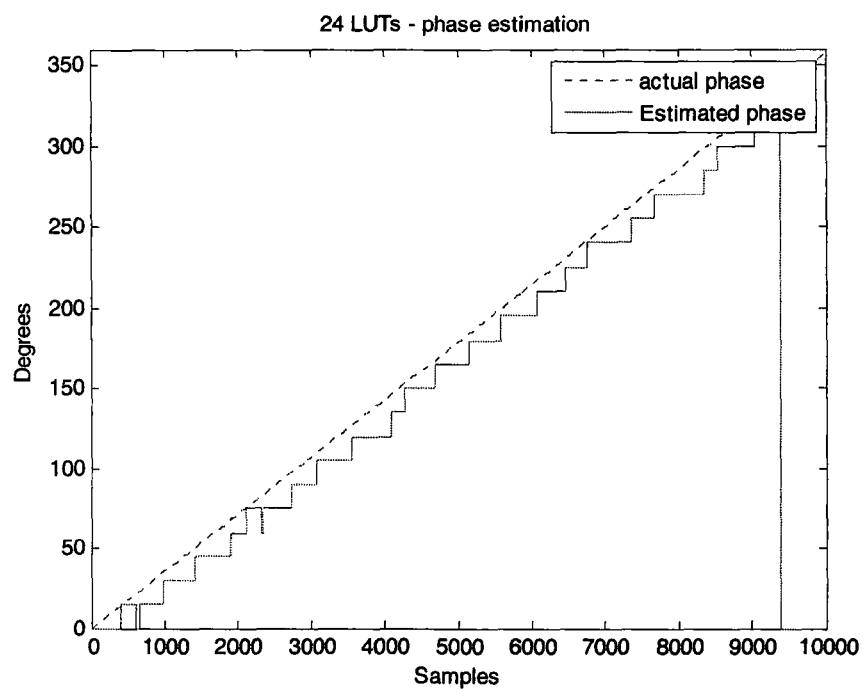
FIG. 12 shows phase estimation using the curves of FIG. 11.

LUT were used, each of which were separated by a 15° increment. FIG. 12 shows the phase estimation using the 24 LUT (with each set 15° apart) which corresponds to FIG. 11 with Eb/No at 11 dB and 200 averages on the LUT selection. It is shown that the estimated phase is well aligned with the actual phase.

Figure 13:
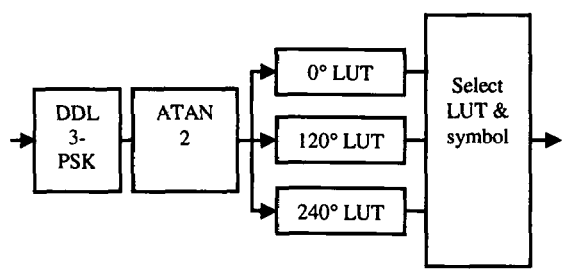
FIG. 13 shows DDL Operation on 3-PSK followed by the LUT and selection circuit.
Figure 14:
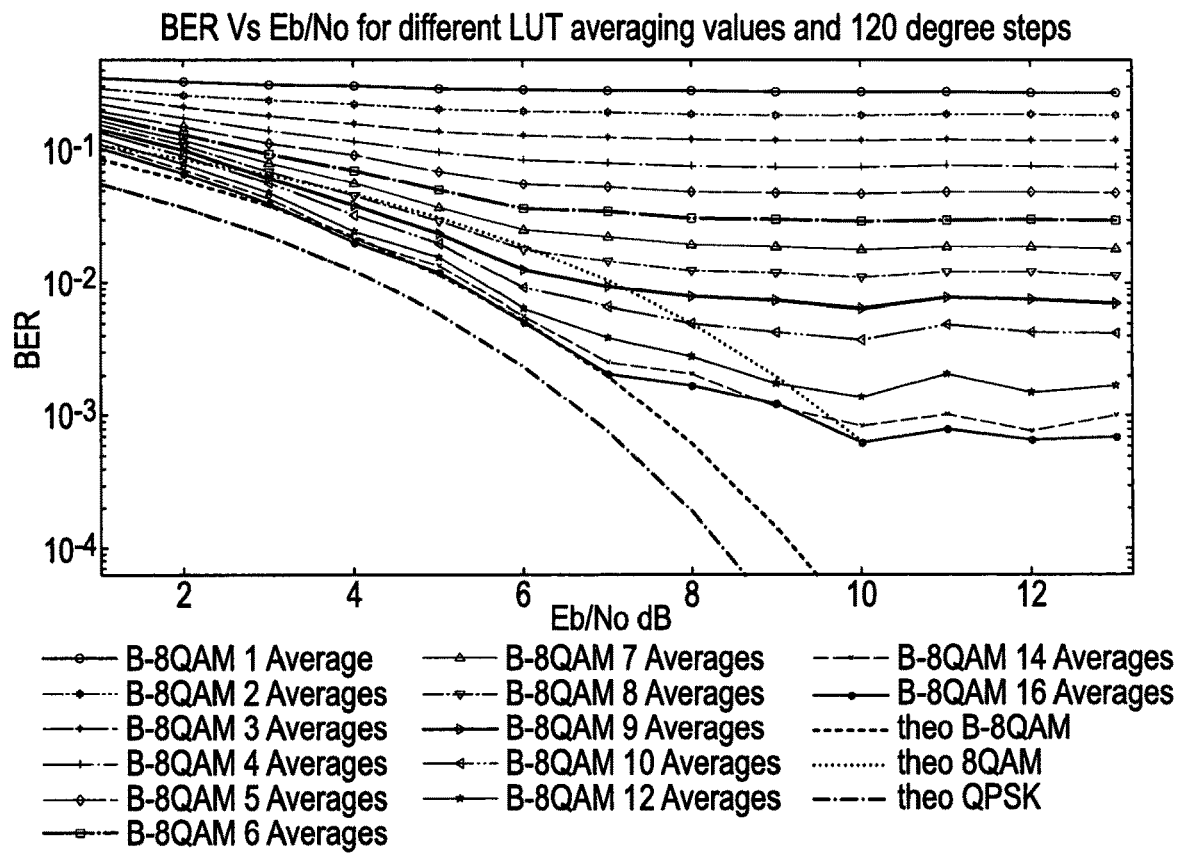
FIG. 14 shows the three LUT solution for different averaging values.

Whilst is has been shown to be possible to construct and implement a PLL free receiver, via the use of multiple LUT's, in practice the presence of frequency errors require the use of PLL's or Frequency Locked Loops (FLLs) to remove frequency errors due to differences in reference oscillators in the receiver and transmitter subsystems and Doppler frequencies. Such a PLL (or alternatively FLL) has been implemented as a Decision Direct Loop (DDL) and, for the odd/even case, would either operate on the 4-PSK signal or the 3-PSK signal. Where the latter is chosen, the loop locks in on one of three phase options. This means that only three LUT's are required to obtain the estimated symbol spaced at 0, 120 and 240 degrees. FIG. 13 shows the DDL operation on the 3-PSK followed by three LUT and selection circuits. FIG. 14 shows the three LUT solution for different averaging values, where it can be seen that significantly less averaging is required to estimate the correct symbol when only three LUT are required.

Notably, if there is no DDL (meaning that there is just removal of the frequency errors) then the number of LUTs is implemented to reduce the BER noise floor i.e. peak phase error which is 360/number of LUT (which are all offset in phase). If the DDL is used however, it is selected to operate on one of the codes and then the number of LUT is the uncertainty.

By taking the Eb/No values for the blind methods in the Gaussian channel, at the $10^{-5}$ BER value, together with all the theoretical values for M-PSK and M-QAM, and ensuring that all of the spread values are set to a factor of 2, results were produced for the spectral efficiency and compared with the Shannon spectral efficiency limit curve.

Figure 15:
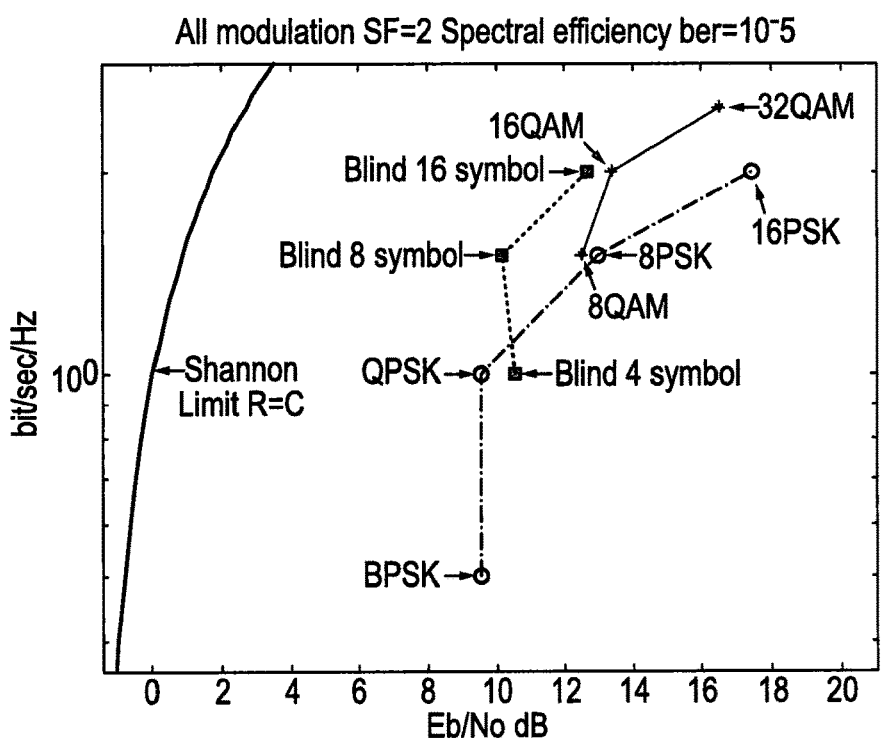
FIG. 15 shows the spectral efficiency performance for the 3PSK.

FIG. 15 shows this spectral efficiency performance, where it can be observed that the blind 18 and 16 symbol versions outperform their corresponding 8-QAM and 16-QAM for spread modulation. The 4 symbol blind technique is however worse than QPSK, but mainly due to the $10^{-5}$ BER value selection point, and it is actually when the FEC is applied that this difference is then minimised due to the similar performance to QPSK at lower Eb/No values. The 8 and 16 Blind versions offer an attractive alternative to rectangular M-QAM not only from a Bit/s/Hz Vs Eb/No perspective, but also from a blind operation perspective which ultimately facilitates very large FEC block sizes, since any slowly changing phase errors caused by of the signal which occurs typically in a mobile channel due to movement, would be continually corrected throughout the frame. The larger frequency errors will need to be removed prior to the signal reaching the LUTs.

Half rate LDPC coding was applied to the source data bits of the blind 8-QAM signal such that there were 64800 encoded bits. Hard bits were passed to the Low Density Parity Check (LDPC) decoder scaled by the current noise variance value. The phase in the channel was indexed as in FIG. 12 so that the first ⅓ of the encoded bits were at phase error of 0°, a ⅓ at 120° and the final ⅓ at 240°. Three LUT's were used to de-modulate the received modulated signal as shown in FIG. 13. The LUT moving averaging value was set to 50.

From FIG. 16 it can be observed that Blind modulation provides a superior performance in the presence of phase indexing error and 3 LUT demodulation. The BER performance at $10^{-5}$ is 0.5 dB Eb/No, a degradation of only 0.04 dB from the static channel performance (not shown). The reference 8QAM co-simulation was run in a static channel, unlike the blind modulation, since when the phase indexing is applied it was found to provide a catastrophic BER performance. The error free Shannon limit line is shown for the spectral efficiency of 0.75 bits/sec/Hz i.e. 3 bits/symbol with a spreading factor of 2 and ½ rate coding.

FIG. 17 shows the performance of the same 64800 bit LPDC ½ rate code applied to both QPSK and Blind 4 symbol modulation, but this time the number of LPDC iterations was set to 30. FIG. 17 also shows raw BER plots (i.e. those without 1 rate LDPC coding). On comparison of the QPSK and the 4 Symbol Blind modulation results with and without ½ rate LDPC coding, the error corrected Blind 4 symbol outperforms QPSK by approximately 0.25 dB. This is due to the raw BER of Blind 4 symbol modulation out-performing QPSK in the 8% to 9% BER region. It is in this BER region that the error correction code starts to effectively correct bits. The error free Shannon limit line is also shown for a spectral efficiency of 0.5 bits/sec/Hz.

The same LPDC FEC coding was applied to the Blind 16 symbol and 16-QAM modulation. The 16 symbol performance with and without LDPC coding (with the number of LDPC iterations was set to 30) is shown in FIG. 18, where it can be seen that since the Blind 16 symbol modulation outperforms 16QAM at low SNRs the error corrected performance is slightly better than 16 QAM.

Achieving simulated results for the error corrected data bits at an error rate of $10^{-5}$ is very difficult due to the very steep gradient of the result. It is not unreasonable to visually approximate where the error corrected curve might intersect the $10^{-5}$ axis and so provide an Eb/No value. These estimated Eb/No values can be plotted against the error free Shannon Efficiency limit curve for comparison. This comparison between rectangular M-QAM with LPDC and Blind modulation with LPDC is shown in FIG. 19, where it can be observed that all the error corrected Blind modulation methods outperform the corresponding M-QAM method.

The Blind modulation method shows significant benefits over coherent rectangular M-QAM modulation. The received signal can be demodulated without the need for pilot symbols and so is classed as blind or unaided. This method facilitates the use of large FEC block sizes without the concern of a phase rotation within the frame caused by either channel dynamics or cycle slipping.

The bias value presented for the 8 symbol and 4 symbol odd even method is an example only and this invention is by no means limited to only these values because further standard optimisation work may provide other bias values that provide maximised performance which is an improvement to the results contained herein.

FIG. 20 demonstrates how the technique can also be applied as a multicarrier system.

FIG. 20 shows the multi-carrier solution with two sub carriers at the transmitter end 1', whereby the information to be transmitted is provided as bits and a demultiplexer 27 takes the input line of bits and routes it to two outputs. Taking the first output of the demultiplexer 27, the bits are converted to symbols by a converter 5 and are subsequently mapped onto two separate odd modulation schemes i.e. the 3-PSK and QPSK via a first modulation module 6 and a second modulation module 7 respectively. The signals are spread by a code spreading function module 8, 9 using orthogonal direct sequence spreading codes which are time aligned. The spreading codes 1 and 0 are provided by a first code source 8a and a second code source 9a respectively.

Once spread the signals are summed together by a summing module 10 with slightly more of the signal power allocated to the higher order modulation scheme e.g. the QPSK scheme. This is achieved by applying a gain by means of a gain amplifier 11 located in the processor pathway intermediate the spreading function module 9 in the QPSK processing arm and the summing module 10.

Once summed together the modulated signal along the first route (comprising the summed 3-PSK and QPSK symbols) are forwarded to a frequency up converter (not shown), whereby the frequency is converted to f1 i.e. the desired first carrier frequency.

Next, considering the second output from the demultiplexer 27 the bits are then converted to symbols at the converter 5' and are subsequently mapped onto two separate odd modulation schemes i.e. the 3-PSK and QPSK by a first modulation scheme module 6' and a second modulation scheme module 7' respectively. The signals are spread by a first spreading function module 8' and a second spreading function module 9' using orthogonal direct sequence spreading codes which are time aligned. The spreading codes 1 and 0 are provided by a first code source 8a' and a second code source 9a' respectively. Once spread the signals are summed together by a summing module 10' with slightly more of the signal power being allocated to the higher order modulation scheme e.g. the QPSK signal. This is achieved by applying a gain by means of a gain amplifier 11' located in the second processor pathway intermediate the spreading function module 9' in the QPSK processing arm and the summing module 10'.

Once summed together the modulated signal passing along the second route (comprising the summed 3-PSK and QPSK symbols) is forwarded to a frequency up converter (not shown), whereby the frequency is converted to f2. Notably the f1 and f2 are two separate and distinct frequencies. The modulated signal along the first route and the modulated signal along the second route are summed at a summing module 28 and forwarded to a transmitter 2 where the final modulated signal at frequencies f1 and f2 are transmitted along a communications channel. Therefore, the same basic method steps of the single carrier method are applied, but the modulated signal is transferred across parallel subcarriers simultaneously.

The multiple LUT demodulator solution 12' of FIG. 6 provides good performance over all receive angles. The signal is received by the antenna 13 and is split at the summing module 23 into a first and second frequency component giving two processing routes. Taking the first route, the signal is de-spread using the de-spreading function module 15, with the de-spreading function being provided by the de-spreading function source 15a. Next the de-spread signal is integrated by the integrator 17 and then the Arctan 2 of the signal is obtained at the Arctan 2 circuit 18 providing a symbol output. This output is forwarded to 1 to n LUT's 29, 29a, 29b which have been adjusted for an optimised demodulation process i.e. each LUT 29, 29a, 29b is set to 360/n angles. This ensures that each LUT measures the quality of the fit of the input angles. The same process is carried out along the second route whereby the signal is de-spread using the de-spreading function module 16, with the de-spreading function being provided by the de-spreading function source 16a. Next the de-spread signal is integrated by the integrator 21 and then the Arc tan of the signal is obtained at the Arctan 2 circuit 22 providing a symbol output. This output is forwarded to 1 to n LUT's 29, 29a, 29b which have been adjusted for an optimised demodulation process i.e. each LUT 29, 29a, 29b is set to 360/n angles.

The final circuit 30 evaluates all of the fit values from the n LUT's and then selects the symbol stream from that LUT as the output data stream.

Beneficially, no data aiding or dedicated pilot spreading codes are required to rapidly de-rotate the received signal and to estimate the received symbol, thereby offering a modulation solution that maximises on signal information space for both single carrier and multicarrier operation. The BER performance is comparable with M-QAM and is scalable to a high number of bits per symbol.

Once demodulated an estimate of the channel can be achieved and so is applicable to efficient MIMO and receiver diversity systems. Therefore, this technique is believed to be a good alternative to the widely used pilot aided OFDM.

It should be noted that an important requirement of the method of this invention is that the angular difference for the resultant mapped symbol is unique within the whole symbol set. Only then can the receiver determine the most likely transmitted symbol for an arbitrary channel phase.

Various modifications to the principles described above would suggest themselves to the skilled person. For example, the communication channel may not be a wireless channel and may instead be provided via an optical fibre or other hardware means e.g. may be wired.

The two Phase Shift Keying schemes applied in the separate branches of the processor at the transmitter end need not be odd and even, for example an alternative embodiment would be to implement an odd-odd scheme e.g. 3PSK and 5PSK.

but using schemes where the summed scheme has an order that is a power of two is understandably desirable from a computational perspective to perform efficient binary applications.

Other spreading codes may be implemented for larger spreading factors to be achieved, for example Gold codes may be applied. The embodiments of the invention use a spreading factor of 2, but values of greater than 2 are also applicable to this technique.

It is appreciated that other optimum solutions exist for the symbol mapping, for example the system also works well using a standard deviation of 187.99 which is slightly less than the Standard Deviation used in Table 1.

In an alternative aspect of the invention, a program could be produced to randomly select the mapping and trial it and measure the BER performance for a fixed signal to noise ratio or find an analytical method to find the optimum mapping of symbols to angles. This alternative approach is considered to be a 'brute force' approach to force a solution to give minimal BER.

In an alternative embodiment the predetermined signal power of the waveform can be split into more than two paths i.e. where the spreading factor is greater than two and where more orthogonal codes are available. If the spreading factor is greater than two, longer codes are used of which there are many known types and which also includes just randomly generated noise as long as they are found to be orthogonal.

In an alternative embodiment of the invention there is provided an analogue input that is sampled to provide quantised or discrete source data. The analogue input may be sampled to provide a wave form vector. The waveform may be provided (either generated by a waveform source or collected from a receiver that feeds the transmitter end) and is sampled at intervals by a sampling module to provide a waveform vector. The waveform vector is then used as the source data.

The demultiplexer need not split the input line into 2 routes and may instead split the single input to greater than 2 output lines.

For reference, the terms Arctan 2 and A TAN 2 have the same meaning and are used in computing to compute the principle value of the argument function applied to a complex number x+iy.

An alternative to the hard angle decision LUT demodulator is a conventional maximum likelihood (ML) estimator which can also provide the hard angle decision function where all symbol options and all static phases or as sub-set of phases are evaluated and from the cost function the minimum selected. As an example of ML, the symbol hypothesis are subtracted from the receiver vector, the most likely symbol is then identified by comparing the resultant powers and selecting the minimum $$\hat{x} = \text{argmin} |y - \hat{x}|^2 \qquad \text{Eq 7}$$

$\hat{x} \in \{\text{all possible values of } x\}$

The FIG. 8 BER vs Eb/No plot also shows the result for a ML demodulator.

It is clear that more complexity is required for the ML method because whilst the LUT operate on integer angle values, the ML instead operates on floating point numbers.

It must be noted that in all simulations the channel was configured to be Gaussian and the static phase shift was set to zero radians, so that only one LUT in the receiver is required.

In an alternative embodiment, the difference between the phase angles for the first set of symbols and the phase angles for the second set of symbols are determined at the summing module 24 as shown in FIG. 3*b*. The LUT (Look Up table) 19 with the differential angle to symbol estimated value is then implemented and the symbols are estimated at the output of the receiver block 12. The difference between the phase angles for the first set of symbols and the phase angles for the second set of symbols are determined and the discrete source data is estimated in dependence upon the angular difference between the first set of complex symbols and the further set of complex symbols by using a look-up table (LUT) 19*a*.

The invention claimed is:

1. A method of de-modulating a modulated communication signal for use with a modulated signal comprising source data being mapped onto a first modulation scheme to obtain a first set of complex symbols and at least one further modulation scheme to obtain a second set of complex symbols, the method comprising:
   a. receiving, over a channel, the modulated signal comprising the first set of complex symbols and the second set of complex symbols;
   b. applying a first phase angle estimation technique to the first set of complex symbols;
   c. applying a second phase angle estimation technique to the second set of complex symbols, such that steps b and c determine phase angle information for the modulated signal using a first phase angle estimator; and
   d. repeating steps b and c using at least one further phase angle estimator and selecting the phase angle estimator which most closely matches a channel phase rotation.

2. The method according to claim 1, further comprising applying a Forward Error Correction decoding technique to the modulated signal.

3. The method according to claim 1, wherein the first phase angle estimator and the at least one further phase angle estimator are offset by a predetermined static phase error.

4. The method according to claim 1, wherein an error detection output signal is provided where there is no match provided at the first phase angle estimator and/or at least one further phase angle estimator.

5. The method according to claim 4, wherein the error detection output signal is averaged over a predetermined time period and a phase angle estimator with a lowest averaged value is selected as a, best match phase angle estimator candidate.

6. The method according to claim 5, further comprising determining a corresponding symbol estimate dependent upon the best match phase angle estimator candidate.

7. The method according to claim 1, comprising applying a digital Phase Locked Loop (PLL) or Frequency Locked Loop (FLL) for removing any frequency errors.

8. The method according to claim 7, further comprising locking the PLL or FLL on the modulated signal associated with at least one of the first modulation scheme or at least one further modulation scheme.

9. The method according to claim 8, further comprising identifying a lower order modulation scheme and applying the PLL or FLL to the lower order modulation scheme so as to maximise a phase angle between symbols.

10. The method according to claim 9, wherein a quantity of phase estimators implemented is directly proportional to an order of a modulation scheme to which it is applied.

11. The method according to claim 9, wherein the first modulation scheme is a QPSK scheme and the at least one further modulation scheme is a 3PSK scheme, further comprising locking the PLL or FLL on the 3PSK scheme.

12. The method according to claim 11, wherein three phase estimators are implemented to estimate a symbol spaced at 0, 120, and 240 degrees.

13. The method according to claim 1, further comprising de-spreading the modulated signal to obtain the first set of complex signals and the second set of complex symbols.

14. The method according to claim 1, wherein the first phase angle estimator and the at least one further phase angle estimator respectively comprise a Look-Up-Table (LUT) or Library.

15. The method according to claim 1, further comprising determining the source data in dependence upon a phase angle of the first set of complex symbols and the phase angle of the second set of complex symbols.

16. A de-modulator device for use on a modulated communication signal which comprises source data being mapped onto a first modulation scheme to obtain a first set of complex symbols and at least one further modulation scheme to obtain a second set of complex symbols, the de-modulator device comprising a receiver, processor and a memory, wherein the memory stores instructions that, when executed causes the processor to:
   a. receive, over a channel, a modulated signal at the receiver, the modulated signal comprising the first set of complex symbols and the second set of complex symbols;
   b. apply a first phase angle estimation technique to the first set of complex symbols;
   c. apply a second phase angle estimation technique to the second set of complex symbols, wherein steps b and c determine phase angle information for the modulated signal using a first phase estimator which is operably coupled with the processor; and d. repeat steps b and c using at least one further phase angle estimator which is operably coupled to the processor to select the phase angle estimator which most closely matches a channel phase rotation.

17. The de-modulator device according to claim 16, wherein the memory stores instructions that, when executed further cause the processor to determine the source data in dependence upon a phase angle of the first set of complex symbols and a phase angle of the second set of complex symbols.

18. A communications arrangement comprising the de-modulator device of claim 16.

* * * * *

UNITED STATES PATENT AND TRADEMARK OFFICE
CERTIFICATE OF CORRECTION

| | | |
|---|---|---|
| PATENT NO. | : 11,463,290 B2 | |
| APPLICATION NO. | : 17/291243 | |
| DATED | : October 4, 2022 | |
| INVENTOR(S) | : Nigel James Tolson | |

It is certified that error appears in the above-identified patent and that said Letters Patent is hereby corrected as shown below:

In the Claims

Column 16, Line 12, Claim 5, replace "averaged value is selected as a, best match phase angle" with -- averaged value is selected as a best match phase angle --.

Signed and Sealed this
Eighteenth Day of April, 2023

Katherine Kelly Vidal
*Director of the United States Patent and Trademark Office*